July 13, 1948.                    J. J. MUNSON                    2,445,076
                                   CANE LOADER
Filed Feb. 21, 1946                                          7 Sheets-Sheet 1
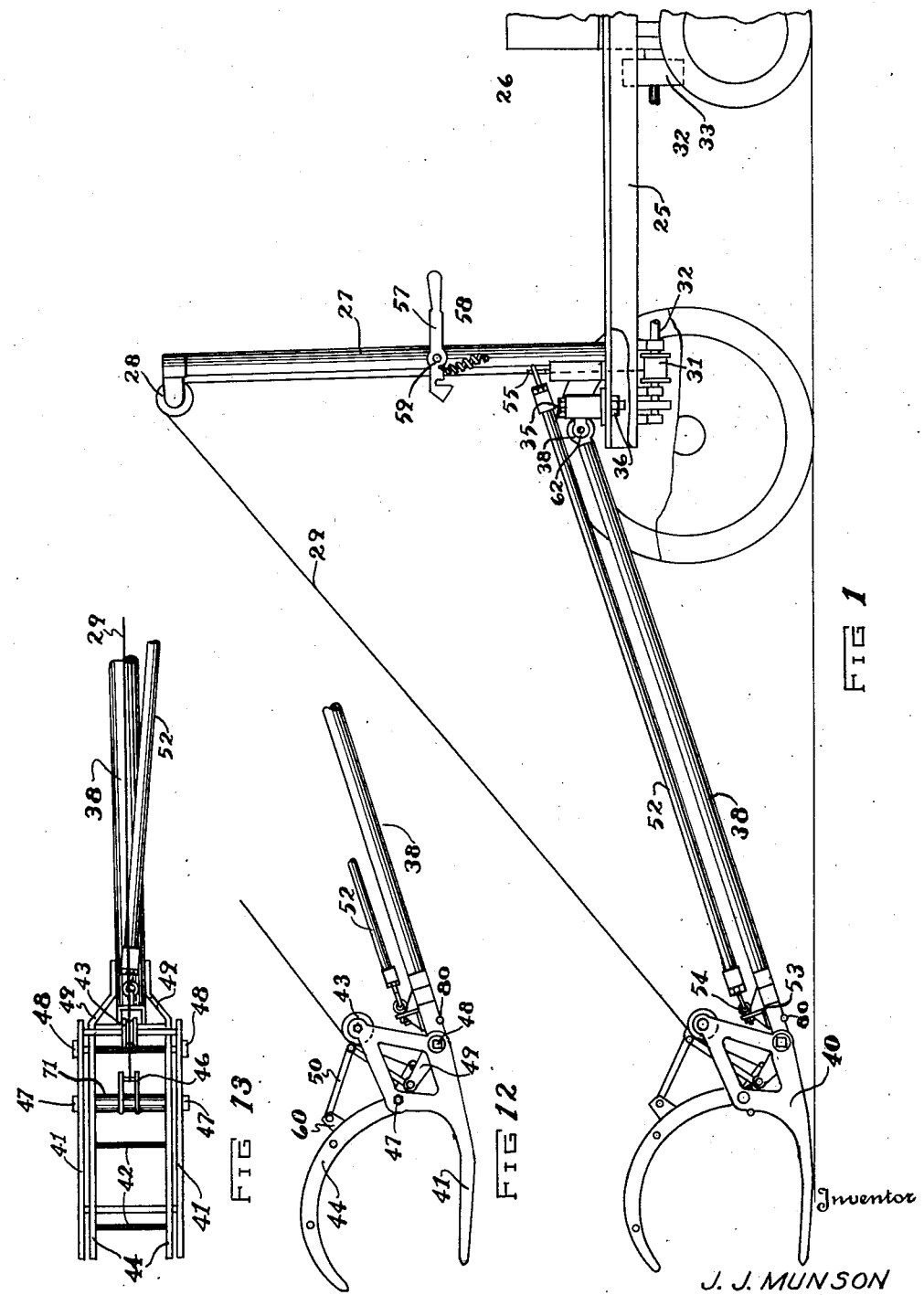
Inventor
J. J. MUNSON
By Wilkinson & Mawhinney
Attorneys

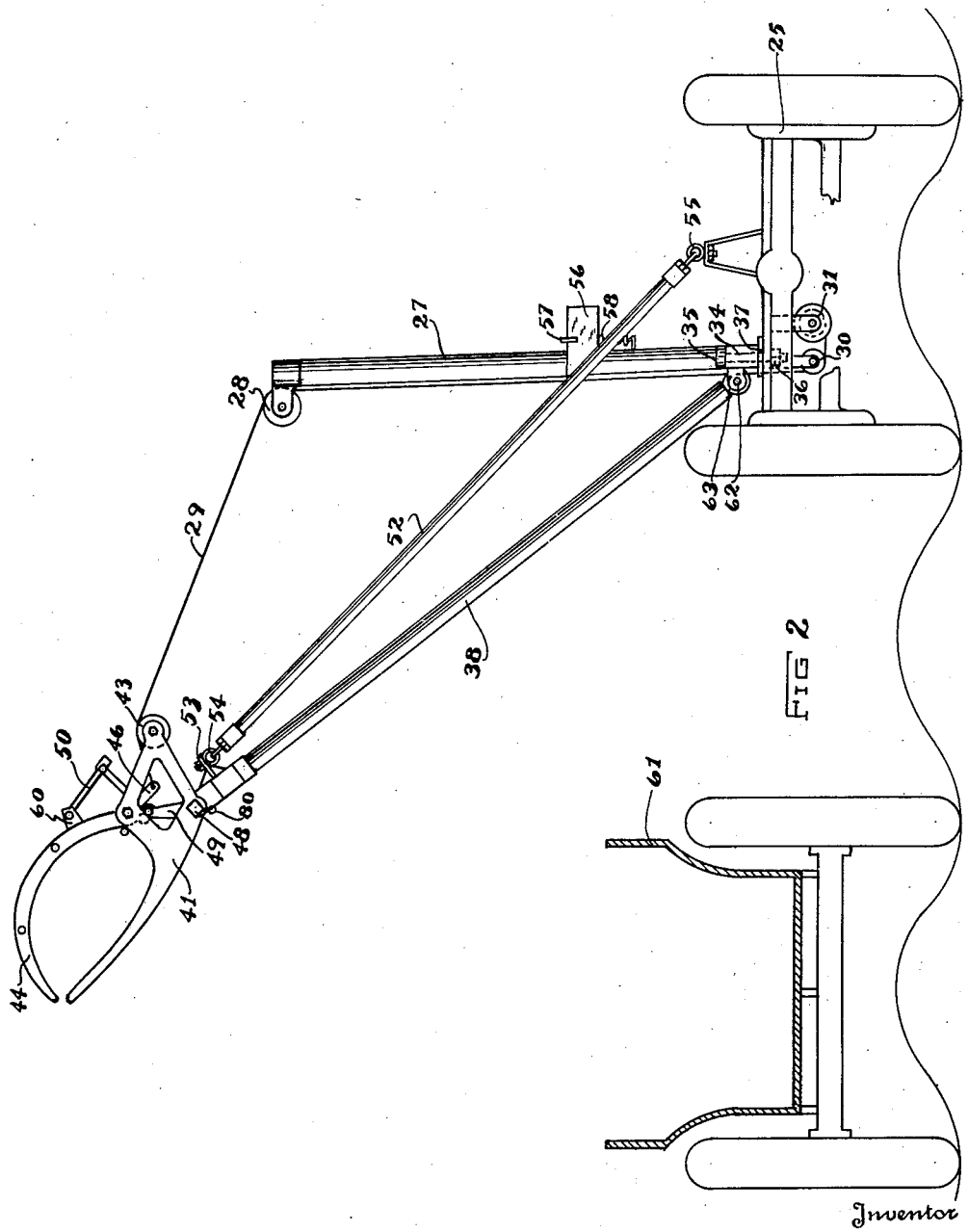

July 13, 1948.    J. J. MUNSON    2,445,076
CANE LOADER
Filed Feb. 21, 1946    7 Sheets-Sheet 3
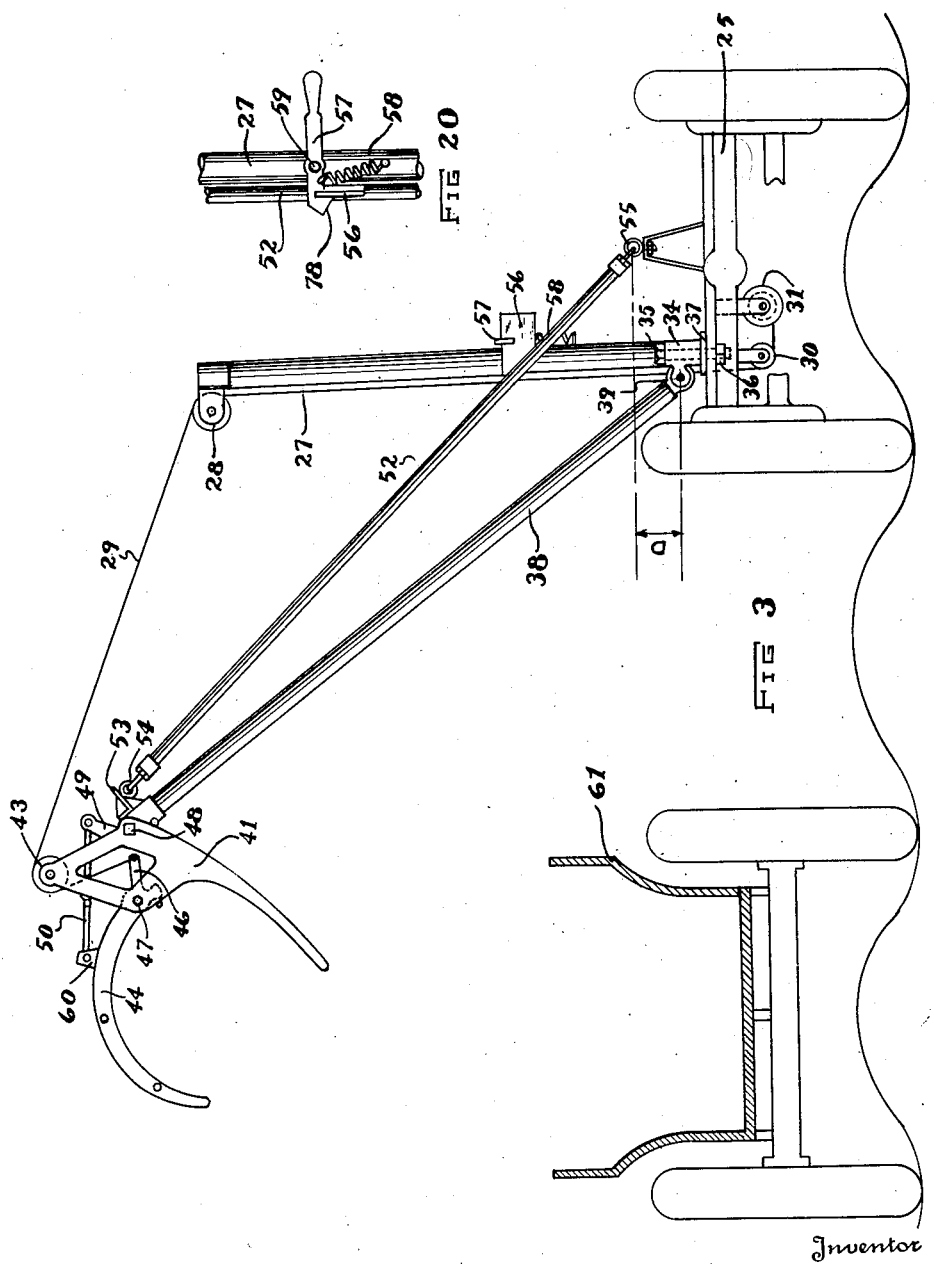
Inventor
J. J. MUNSON
By Wilkinson & Mawhinney
Attorneys

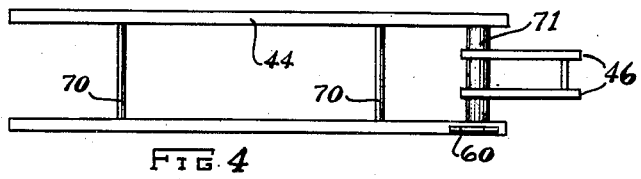
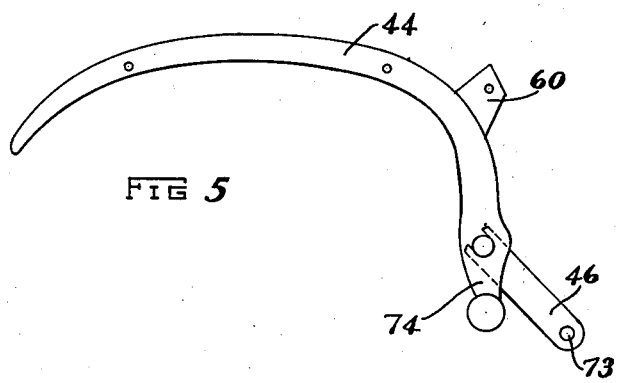
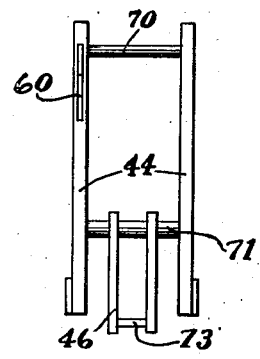
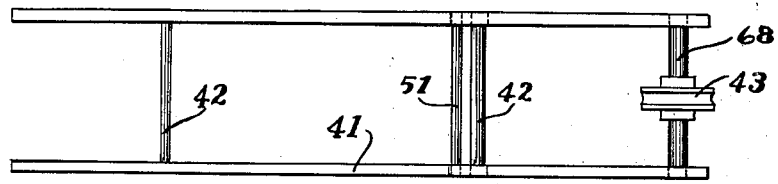
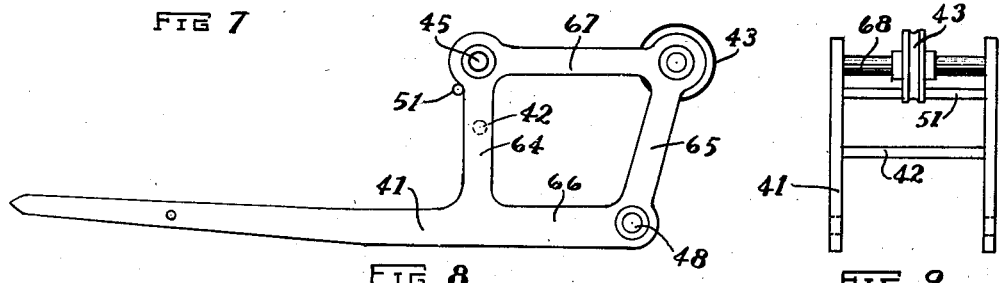
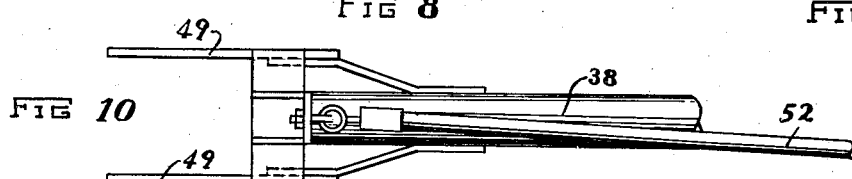
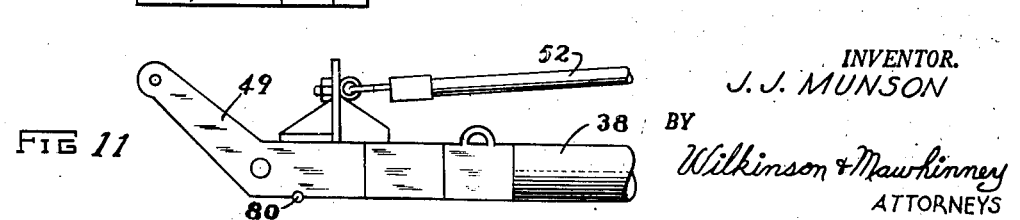

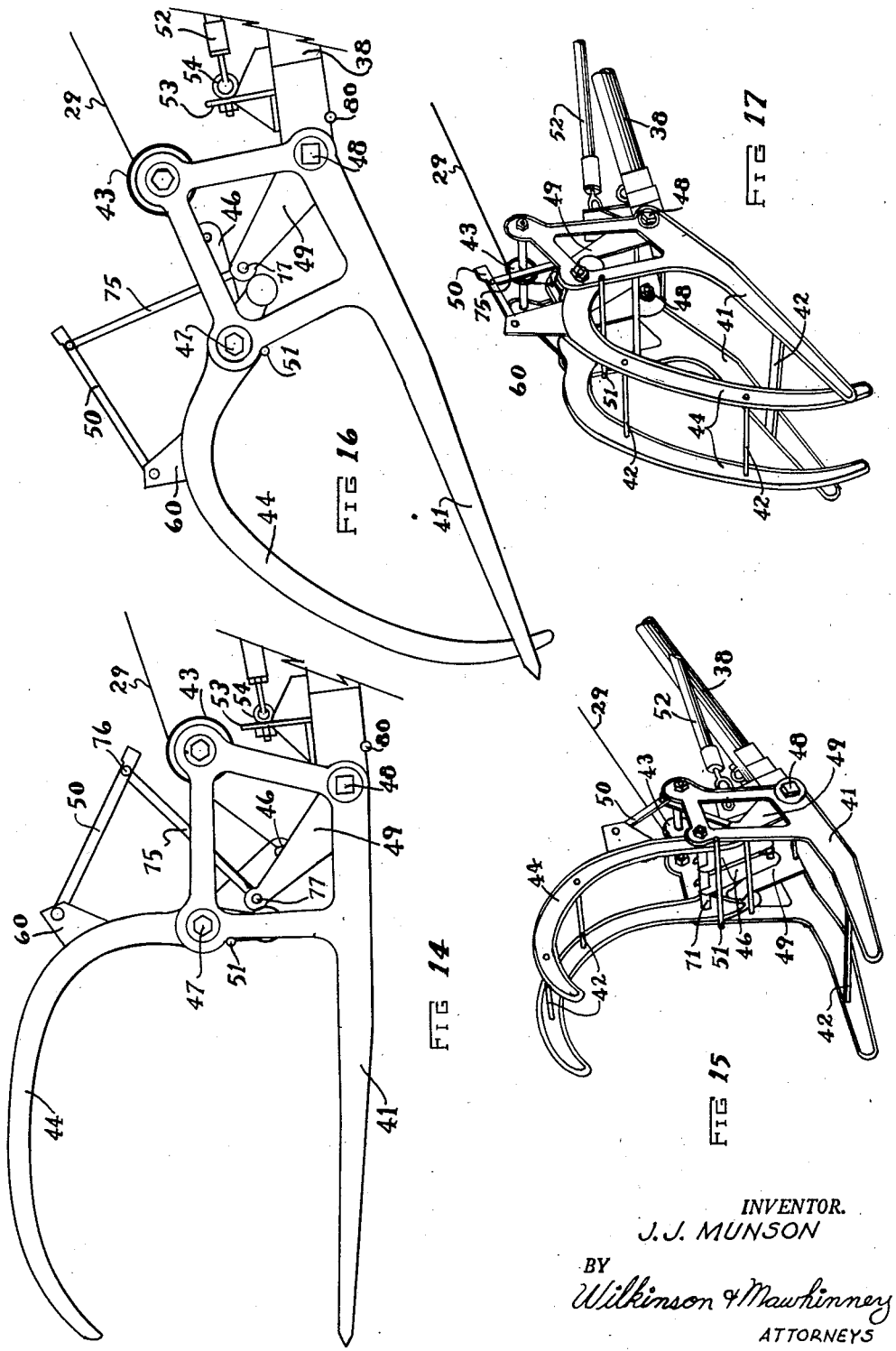

July 13, 1948.  J. J. MUNSON  2,445,076
CANE LOADER
Filed Feb. 21, 1946  7 Sheets-Sheet 6
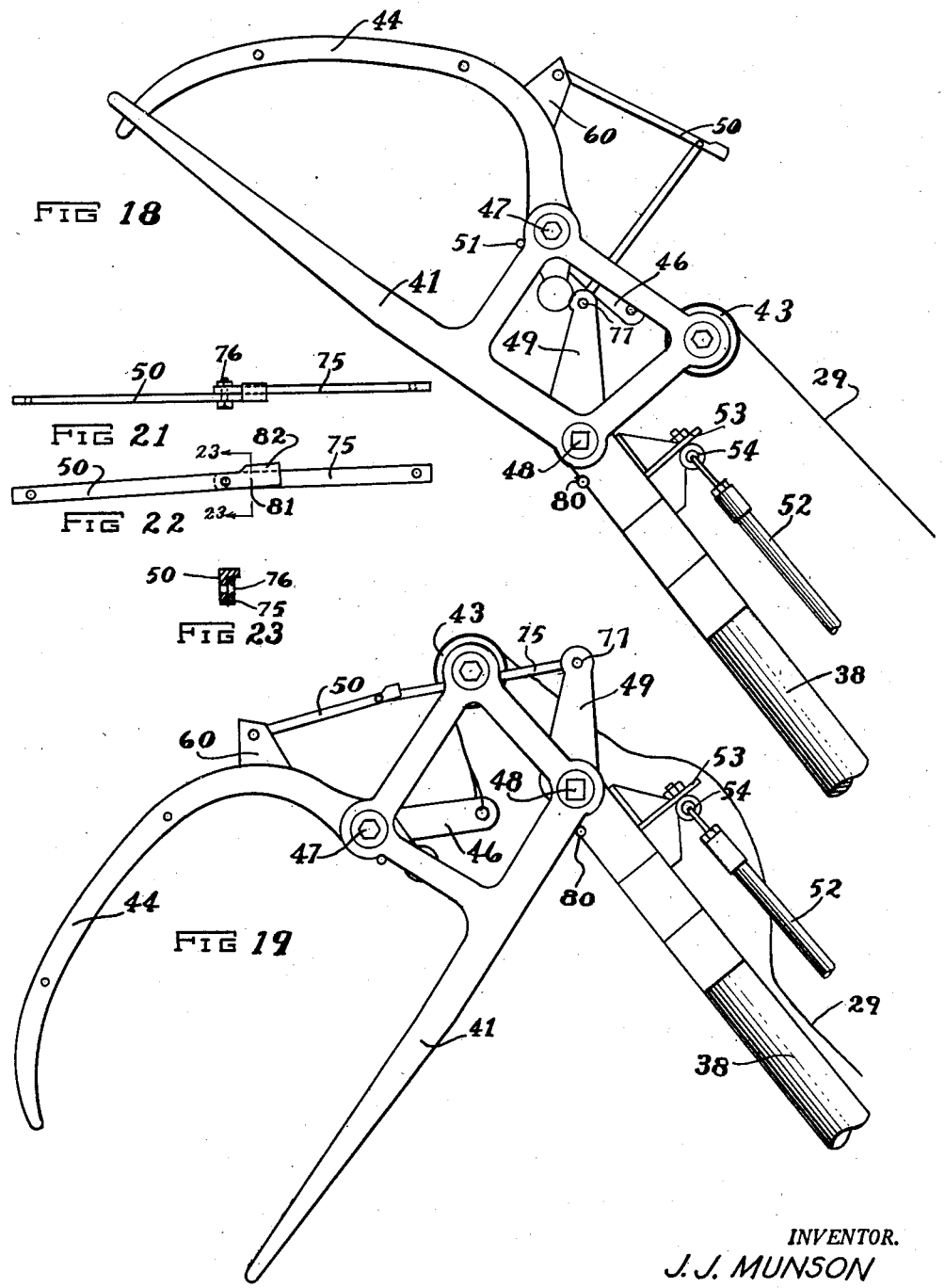
INVENTOR.
J. J. MUNSON
BY
Wilkinson & Mawhinney
ATTORNEYS

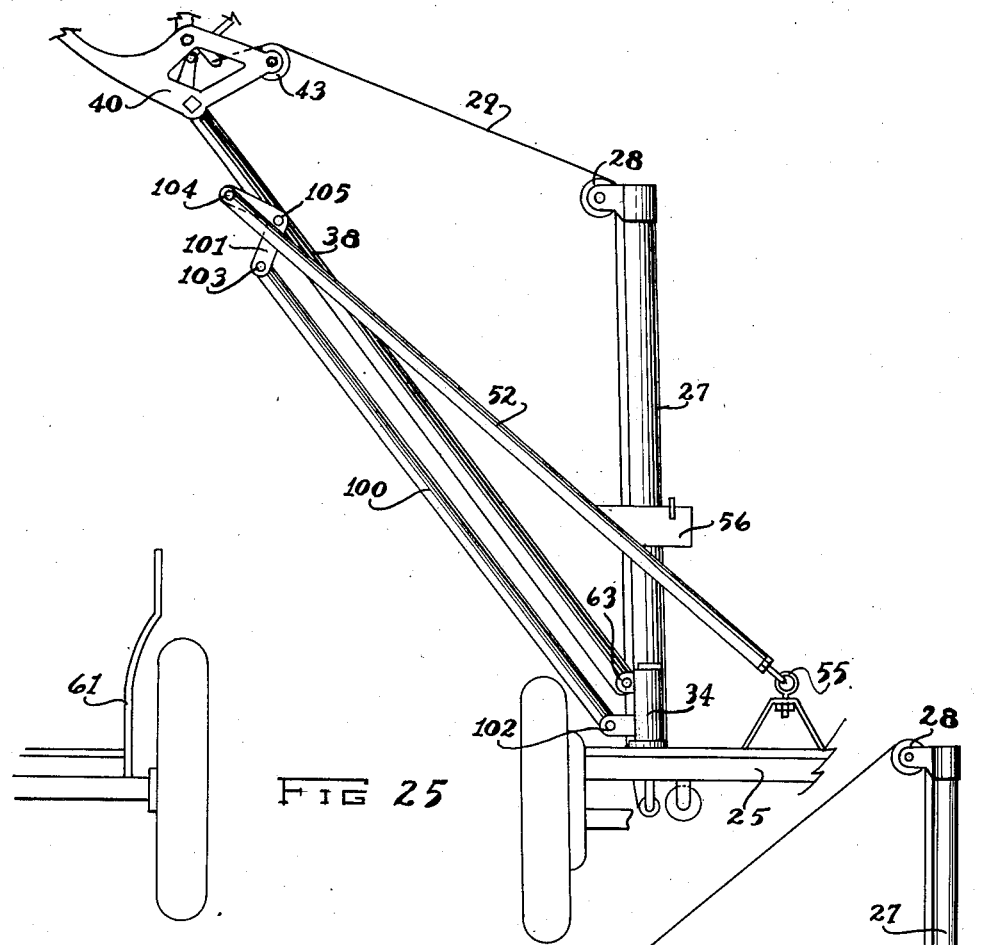
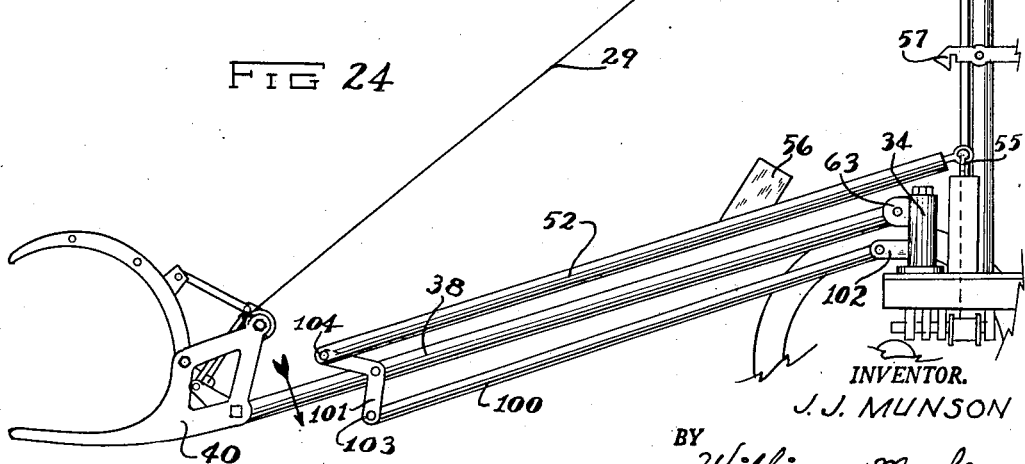

Patented July 13, 1948

2,445,076

UNITED STATES PATENT OFFICE 2,445,076

CANE LOADER

Joseph J. Munson, Houma, La.

Application February 21, 1946, Serial No. 649,235

10 Claims. (Cl. 214—147)

The present invention relates to cane loaders, and more particularly to such equipment as employed for loading sugar cane and the like from the fields on the various types of conveyances, such as carts, wagons, etc.

An object of the invention is to provide a cane loader of a cheaper type of construction and which may be operated much more economically as compared with conventional loading equipment; as an example, the loader may be operated by one man, whereas as many as seven are required to operate many of the loaders now in use.

A further object of the invention resides in providing an improved loader that will pick up the cane leaving but little cane on the rows and clamps such cane tightly while it is being lifted to the carts or wagons to avoid the loss of any of the cane from the grab, and in this way rendering it unnecessary to employ any labor for collecting the cane left on the rows which is a requirement in the operation of conventional type loaders.

As is well known, in Louisiana and other cane growing countries, cane is grown in rows and, after being cut in the harvesting operation, is placed crosswise of these rows, cane loaders being employed to pick up this cane and deposit it in carts for transporting to the factory or conveyances, such as railroad cars, sometimes employed for hauling the cane to factories.

Other objects of the invention are to generally improve the efficiency of mechanical cane loaders, to improve the construction and mode of operation of the grab by which the jaws may be more effectively opened and closed and caused to retain a tight grip on the cane during the elevating movement, and to generally improve and simplify the hoisting mechanism which entails the lateral shift of the grab in elevated position to a point over a cart or wagon.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an improved mechanical cane loader constructed in accordance with the present invention and with the grab in the lowered open position.

Figure 2 is a front elevation, with parts broken away, showing the grab hoisted and poised for a discharge over a cane receiving cart.

Figure 3 is a similar view with the grab opened for discharge.

Figure 4 is a top plan view of the upper jaws of the grab.

Figure 5 is a side elevation of the upper jaws of the grab.

Figure 6 is an end elevation of the upper jaws of the grab from the right hand end of Figure 5.

Figure 7 is a top plan view of the lower jaws of the grab.

Figure 8 is a side elevation of the lower jaws of the grab.

Figure 9 is an end elevation of the lower jaws of the grab taken from the right hand end of Figure 8.

Figure 10 is a top plan view of the grab end of the boom.

Figure 11 is a side elevation of the grab end of the boom.

Figure 12 is a side elevation of the grab in an open position.

Figure 13 is a top plan view of the assembled grab.

Figure 14 is an enlarged side elevation of the grab with the jaws open.

Figure 15 is a perspective view of the grab with the jaws open.

Figure 16 is a side elevation of the grab in a closed position when starting its lift with the cane load.

Figure 17 is a perspective view of the grab in the closed lift position.

Figure 18 is a side elevation of the grab in the raised position just prior to release of load.

Figure 19 is a side elevation of the grab in the discharge position.

Figure 20 is a side elevation, partly broken away, of the mast and guide arm showing the latching arrangement.

Figure 21 is a top plan view of the grab-opening linkage.

Figure 22 is a side elevation of the same.

Figure 23 is a cross section therethrough taken on the line 23—23 in Figure 22.

Figure 24 is a side elevation of the improved mechanical cane loader with the grab in the lowered open position and showing an alternate mechanism associated with guide arm 52 for selectively controlling the lateral movement of the grab during its upward motion with boom 38.

Figure 25 is a front elevation showing the grab hoisted and poised for a discharge over a cane receiving cart with the alternate mechanism referred to in Figure 24.

Referring more particularly to the drawings, 25 designates a vehicle, for instance a tractor driven by an engine 26 installed thereon and having the usual steering and other controls which are conventional accessories upon such tractors. On the forward portion of the vehicle 25 is erected a mast 27, preferably at one side of the longitudinal center line, as indicated in Figures 2 and 3. This mast may be of variable vertical height. Also the sheave 28 carried by the upper portion thereof may be vertically adjustable upon the mast. Such sheave 28 receives therethrough a cable 29 which acts in the capacity of both a hoist and a grab-opening and closing cable, the outer end of the cable being affixed to a part of the grab as hereinafter described.

The cable extends from the grab to the sheave 28, vertically down along the mast 27 and runs beneath a guide sheave 30 carried upon an appropriate part of the vehicle framework, and thence such cable 29 runs to a rotary drum 31 mounted in appropriate bearings in the vehicle framework. As shown more particularly in Figure 1 the drum shaft 32 extends to a clutch or transmission 33 by which the shaft 32 and the drum 31 may be rotated by the engine at the will of the operator of the vehicle and in a direction to wind the cable 29 thereon.

At the forward portion of the vehicle, and preferably in front of the mast 27 is a swivel or universal support for a boom 38. In this instance the inner end of the boom 38 is shown to pivot vertically about a horizontal bolt 62 mounted through such inner end of the boom 38 and through a pair of perforated ears 63 which project laterally from a vertically disposed collar 34 which swivels about a bolt 35 having its axis disposed vertically. A nut 36 serves to retain the bolt in place upon the vehicle. The collar 34 rotates about the vertical axis of the stud or guide bolt 35, rotating upon a rear plate 37 carried by the vehicle.

Thus the boom 38 may swing up and down in a substantially vertical plane about the horizontal axis or fulcrum 62 and at the same time rotate about the vertical axis of the guide bolt 35. In short the inner end of the boom 38 has a substantially universal movement upon the vehicle.

Associated with the boom 38 is a guide arm 52. The outer end of the guide arm 52 is swivelly connected to the outer end portion of the boom 38. For instance interengaging eyes 54 upon the guide arm 52 and the boom bracket plate 53 may provide such connection. At its inner end the guide arm 52 is swivelled to the frame of the vehicle 25 as by the interengaging eyes 55. The swivel point 55 of arm 52 at the tractor should be raised substantially above that of boom 38. This point for 52 must be higher than the tractor swivel point 39 for boom 38, otherwise the boom 38, with its grab 40, will not be pushed around laterally to the discharge position over the wagon. It is the difference in elevation between these two points indicated as D, Figure 3, that causes the lateral movement when the grab 40 is being raised. The length of the guide arm 52 and its offset connection 55 with respect to the universal connection of the boom 38 to the vehicle requires that on the raising movement of the boom 38 as shown in Figures 2 and 3 such boom 38 will be swung laterally to poise the grab above a wagon or cart 61 which will be in readiness to receive the cane deposited by the grab as indicated in Figure 3. In order to provide an alternate mechanism for more selective control of the lateral movement of boom 38 with the grab in its upward travel, link 100 and bell crank 101 are added in combination with guide arm 52, Figures 24 and 25. Link 100 is pivoted at 102 to an extension of collar 34 and at 103 to the lower end of bell crank 101. Guide arm 52 is swiveled at 55 to the vehicle 25 and pivoted to the upper end of bell crank 101 at 104. The bell crank 101 is pivoted to the boom at 105.

As the boom 38 is raised from the position shown, Figure 24, bell crank 101 is rotated about pivot point 105 in the direction of the curved arrow with the result that boom 38 with grab is swung laterally in an opposite direction to the wagon or cart until pivot point 104 passes the center line of boom. Further rotation of the bell crank, caused by further elevating 38, reverses the lateral movement of boom 38 and grab 40 and causes a more rapid swing toward the wagon or cart 61 in the remainder of the upward travel.

By adjusting the angle and length of the bell crank arms and the position of 102, the path of the lateral movement of the grab in its upward motion can be varied at will as, for instance, the grab can be made to move away from the wagon so that the ends of the cane will not strike it until the top of the wagon is reached when the lateral motion can be reversed to quickly move the grab to its discharge position.

The discharge position is shown in Figure 25, which shows the position of the bell crank after its extreme counterclockwise rotation from the position, Figure 24, which shows that the first effect in elevating the grab from the position Figure 24 is the same as though the arm 52 was shortened, which pulls the grab away from the wagon while in the position, Figure 25, the same result has been obtained as though the arm 52 was lengthened which has the effect of pushing the grab further toward the cart to compensate for the prior effect of pulling away from the cart.

A more detailed explanation of the action of guide arm 52 will be given later.

The improved grab and its associated parts is shown more particularly in Figures 4 to 11 inclusive.

Referring more particularly to Figures 7, 8 and 9, a grab frame is shown as carrying the two spaced and parallel lower fixed jaws 41 having their lower edges sloped to form runners for being received upon and moving over the ground. These lower jaws 41 extend from the lower portions of two side frames which are connected together by the cross rods 42 welded or otherwise affixed to such side frames and to the two lower jaws 41.

As shown more particularly in Figure 8 such side frames may be generally rectangular or diamond shape and are composed of the vertical sides 64 and 65 and the horizontal sides 66 and 67. The lower horizontal sides 66 may be in substantial alignment with the lower jaws 41, being in the instance shown prolongations of the same. The lower right hand corner portions 48 form the fulcrum about which the grab as a whole rotates about the boom 38, for which see Figures 14 to 19 inclusive.

As shown more particularly in Figures 7 and 9 a sheave 43 rotates in the central portion of a tubular or other shaft 68 over which the cable 29 runs as later described. This shaft 68 is connected at the upper right hand corners of the frames as viewed in Figure 8. The upper left hand corners of the frames act as the fulcrum 45 for the upper jaws and a stop rod 51 is welded or otherwise affixed across the frames just beneath this fulcrum 45.

The construction of the upper jaw member is shown more particularly in Figures 4, 5 and 6 and comprises one or more upper jaws 44 of a desired curvature arranged in spaced parallel relation where two or more jaws 44 are employed and being connected together by the rods 70 which are welded or otherwise secured to the curved jaw members 44. A tube 71 extends across between the two movable jaws 44 at the lower articulated end portions thereof adapted to align or register with the fulcrum opening 45 of the grab frame to permit the insertion of a bolt or fulcrum 47 on which the upper jaw structure as a unit may rotate.

As shown in Figures 4 and 6 the tubular shaft 71 has affixed thereto as by welding or otherwise a pair of parallel tail pieces 46 joined at their lower free ends by a cross pin 73 which may form a convenient part to which to attach the outer end of the hoist cable 29. The parts 46 constitute an upper tail piece or member for the movable jaws 44. These jaws have other tail pieces 74 which may diverge angularly with respect to the tail pieces 46 and might be called the lower tail pieces. The tail pieces 74 are adapted to strike the stop rod 51 in the fully open position of the jaws as shown in Figure 15.

As shown more particularly in Figures 14-19 inclusive, the boom 38 carries a forked or bifurcated head with angular horns 49 upstanding therefrom spaced wider than the upper tail pieces 46 and positioned to contact the lower tail pieces 74 of the upper pivoted jaws 44. These horns 49 are shown to be two in number and to cooperate with the two tail pieces 74 which are arranged closely inside the two side frames of the grab in order not to interfere with the motion and action of the upper tail pieces 46 which, as shown in Figure 6, are in an intermediate position spaced between the lower tail pieces 74. Thus the cable 29 will be free of any interference for all of its length between the pulley 43 and the upper tail piece cross pin 73.

One of the upper jaws carries a perforated lug 60 to which one end of a link 50 may be pivoted. This link 50 is a part of a linkage with a companion link 75 pivoted thereto as indicated at 76. The other end of link 75 is pivoted to one of the horns 49 as indicated at 77. Thus the linkage 50, 75 is entrained between the upper movable jaw unit and a horn 49. This horn 49 is a fixed anchor for the linkage inasmuch as the horn 49 is carried by the boom 38 and partakes of neither the swinging movement of the entire grab about the boom horizontal fulcrum 48 nor the individual pivoting movement of the upper jaws 44 about the grab frame on the fulcrum 72.

Referring more particularly to Figures 1, 3 and 20, a means for holding the boom and grab in the upper position while discharging is shown to consist in this instance of a latch plate 56 welded or otherwise affixed to the guide arm 52 at that portion thereof adapted to closely approach the mast 27 in the raised position of the boom and guide arm. Such latch plate is adapted to encounter the beveled nose 78 of a latch lever 57 fulcrumed at 59 on the side of the mast 27 in a position adjacent the hand of the operator of the vehicle. A coil spring 58 connected between the latch lever 57 and the mast tends to draw the nose end 78 of the latch downwardly. When the boom 38 and guide arm 52 approach the fully raised position, the latch plate 56 encounters the nose 78 and causes the rotation of the latch 57 in opposition to the action of the spring 58 sufficiently to enable such plate 56 to snap back of the nose 78. In this position the spring 58 will maintain these two parts latched until manually released by the action of the vehicle operator.

In operation, Figure 1 shows the boom 38 lowered, in which case, it extends substantially forward but on a slight angle with respect to the center line of the tractor 25 to permit the grab to rest in the depression between rows in which the wheels of the tractor nearest to the wagon or cart 61 travel and across which depression the sugar cane is placed either distributed along the rows or in piles. The boom 38 is pulled to this position by the guide arm 52 in the lowering movement. The boom may be lowered by gravity by simply slackening the cable 29.

As the boom 38 descends the lower jaws 41 will first encounter the ground, it being understood that from the discharge position shown in Figure 19 the cable 29 will be drawn sufficiently taut to rotate the grab about the boom fulcrum 48 a sufficient angular distance in a clockwise direction to insure that the lower free ends of the lower jaws 41 do not dig into the ground. Whereas the entire weight of the grab is borne by the boom 38 and the cable 29 prior to the contact of the grab with the ground, and whereas the entire weight of the grab is forwardly of the boom fulcrum 48 so that the grab will have a constant tendency and bias to rotationally move anticlockwise about the boom fulcrum 48 by the action of gravity when permitted to do so by the slackening of the cable 29; as soon however as the grab strikes the ground the weight thereof will be removed from the boom and transferred to the ground and the tendency of the boom 38 to fall further will have the reverse effect now causing rotation of the grab as a whole in a clockwise direction about the boom fulcrum 48 so that the grab may take up the position indicated in Figure 1. At the same time in moving from its upper to its lower position the boom 38 causes its horns 49 to angularly turn from the position of Figure 19 to that of Figure 14 during which angular anticlockwise rotation, as seen comparatively in Figures 16 and 14 the ends of the horns 49 will wipe across the lower tail pieces 74 thus setting up in the upper jaws 44 a clockwise rotation about the individual fulcrum 47 which is independent of any general rotation of the grab as a whole about its boom fulcrum 48. Thus the jaws are opened as indicated in Figures 14 and 15, this opening movement continuing until the tail pieces 74 strike the stop rod 51. Such movement shifts the upper tail piece 46 down to its lowermost position as shown in Figure 14, pulling outwardly upon the cable 29.

With the grab upon the ground and the jaws fully open the operator drives his vehicle forwardly, it being understood that the inclination or curvature of the lower portions of the fixed jaws 41 is such as to ride over the ground readily without digging into the same and these jaws may be arranged to straddle the rows or to fit into the depressions between the rows in the most effective manner to pick up the cane which has been laid crosswise of such rows.

The vehicle is driven forwardly a sufficient distance to accumulate a full load of cane in the jaws whereupon the same is stopped and the drum 31 put into its winding operation. As the cable 29 is wound upon the drum 31 the cable in the first instance pulls upon the upper tail piece 46 to close the upper jaws 41 as indicated in Figure 16 rotating the same about their individual fulcrum 47. At the same time the lower tail pieces 74 are caused to rotate beneath the horns 49 thus camming or levering the grab in the anti-clockwise rotational direction about boom fulcrum 48. This position is also shown in Figure 16. This movement can only be achieved by a slight raising of the outer end of the boom. The grab will assume a slightly drooping position with respect to the boom as shown in Figures 16 and 17. The cable 29 continues to be wound upon the drum 31 and in so doing having closed the jaws it now proceeds to raise the boom. Figures 2 and 18 show the highly raised position of the boom and grab with the grab poised over the cart 61.

With the parts in this position the cable 29 is payed out or slackened by releasing the brake of the drum 31. When so slackened the weight of the grab and the weight of the cane contained therein cause such grab to rotate counterclockwise on the boom fulcrum 48 for which compare Figures 18 and 19. The boom having been raised to its uppermost position, the horns 49 are now upright and the falling or drooping of the grab to the position of Figure 19 causes the linkage 50, 75 to be drawn out to its full extent. This linkage is of such limited length that it will when stretched out to its limit check that movement of the upper jaws 44 which is entailed through the gravitational fall of the grab as just described about the boom pivot 48. In other words before this gravitational movement of the grab as a whole has gone through its complete cycle the linkage arrests the upper jaw 44. Of course the pivotal fulcrum point 47 of the upper jaws 44 is still compelled to rotate with the entire grab about the boom fulcrum 48 but this only multiplies the action of the linkage in jerking open the upper jaws 44. Thus while the lower jaws 41 are dropping downwardly the upper jaws 44 are pulled outwardly and upwardly in the relatively opposite direction to fully open the grab and to direct its mouth downwardly so that the cane recently held therein may be discharged and promptly deposited in the wagon 61 below.

It will be noted from a comparison of Figures 18 and 19 that in moving from the closed to the open discharge position, the pulley shaft 68 escapes around the outer ends of the horns 49. Therefore the arms of the grab side frames, particularly the arms 65 must be longer than the length of the horns 49.

The latch couple 56, 57 acts to hold the boom 38 in raised position during the dumping operation in which the hoist cable 29 is necessarily slacked. After dumping, the cable 29 may be drawn taut sufficiently to assume the load before the latch 57 is manually released, after which the cable 29 may be gradually slacked to lower the boom 38 and its grab to the ground where the grab will again automatically open as hereinbefore explained in readiness for the next load. After dumping when the cable 29 is drawn taut the grab will close and descend substantially in the condition shown in Figure 16. When the grab strikes the ground the clockwise rotation of the same moves lower tail pieces 74 against horns 49 thus opening the grab.

In Figure 19 the grab frame is shown in its extreme counter-clockwise position where it engages a stop 80 projecting from the boom 38.

In Figures 21, 22 and 23 the links 50 and 75 are more particularly shown with one of the links 50 having an integral extension 81 beyond pivot 76 and overlapping the companion link 75. A lug 82 on the extension 81 is positioned to overlie and engage the top edge of the companion link 75 in the closing movements of the linkage.

Figure 22 illustrates the function of the lug 82 in preventing the linkage from straightening out. If the three pivots of the linkage are allowed to arrive into alignment then a toggle-lock would result resisting the action of the cable 29 in pulling the grab out of the extreme dumping position of Figure 19.

A flexible cable or wire might be used in place of the linkage.

As the carrier or tractor is moved toward the sugar cane in the direction toward the left as shown in Figure 1, the sugar cane is crowded into the grab until it is full. The stiff arm 52 holds the grab in position so that it cannot move sidewise while the boom 38 is taking compression. The swivel point 55 is so located that, as the boom 38 is swung upwards it is pushed around through approximately 90° by the time it reaches its top position. Moreover the point 55 is so located that there is practically no rotation of the boom 38 about its vertical fulcrum until the grab is above the top of the cart or wagon 61. This is in order that the sugar cane will not strike the side of the wagon as it moves upwards. As the boom 38 comes down after depositing the load from the grab, the stiff arm 52 pulls it back in the forward center line position of the carrier or tractor.

Any suitable hoist mechanism may be mounted upon the carrier or tractor to wind in and pay out the cable 29.

From the position shown in Figure 14, where the grab is upon the ground, the first action of cable 29 in being wound in is to tend to rotate the upper jaws 44 in a counterclockwise direction about 72. This tends to force the lower tail pieces 74 against the lower side of the horns 49 and produces a powerful turning movement counterclockwise on the entire grab frame about the fulcrum 48. This causes the lifting of the fulcrum 48 before such movement of the grab can be accomplished. Such position is shown in Figure 16. At the same time a movement is set up tending to prevent the drooping of the grab about the fulcrum 48, namely the tension of the cable 29 multiplied by the distance between the line that the taut cable assumes between sheaves 43 and 28 and a line parallel thereto passing through the fulcrum 48; but this moment is much less than that produced by the action of the lower tail pieces 74 upon the undersides of the horns 49. The distance between the two imaginary lines referred to changes in magnitude with changes in rotational position of the grab frame about the fulcrum 48 because such rotational angular position affects the position of the pulley 43 which determines the upper imaginary line. This latter turning moment tends to hold up the grab together with the load of cane during the raising movement. To increase or decrease this latter moment in any position of the grab is simply a matter of increasing or decreasing the distance between the two imaginary lines referred to. This may be done by raising or lowering the height of the mast 27 or adjusting the sheave 28 up and down upon this mast. It also may be controlled by changing the radial distance of the sheave 43 from the center 48.

It is obvious that various changes and modifications may be made in the details of construction and design of the above specifically described embodiment of this invention without departing from the spirit thereof, such changes and modifications being restricted only by the scope of the following claims.

What is claimed is:

1. In a cane loader, a vehicle, a boom universally mounted on said vehicle, a grab carried by said boom, a bell-crank pivoted on the boom at a point near the free end thereof, a link arm, one end of which is pivoted to an end of the bell-crank and the other end of which is pivoted to the vehicle beenath the vertical pivot at the universal mounting of the boom, and a guide arm, one end of which is connected to the other end of the bell-crank and the other end of which is swivelly mounted on the vehicle frame adjacent the boom mounting and spaced laterally therefrom to cause a lateral swing of the boom when it is raised.

2. A cane loader as claimed in claim 1 characterized by the fact that the swivel connection of the guide arm upon the vehicle is at a point of higher elevation than the vertical pivot of the boom universal mounting.

3. In a cane loader a vehicle having a frame, a boom universally mounted on the frame of said vehicle, a bifurcated support on the free end of said boom, upturned horns at the ends of said bifurcated support, a grab pivotally carried on said bifurcated support comprising a grab frame pivoted about said support, lower jaws fixedly carried by said grab frame in sliding engagement with the ground upon forward movement of the vehicle with the grab rotated clockwise to an upper position with respect to the grab pivot on the bifurcated support, upper jaws pivoted to the upper part of said grab frame at a point removed from the grab frame pivot support by a distance in excess of the length of said boom horns, upper and lower tail pieces carried by said upper jaws, said upper tail pieces being intermediate the jaw members and said lower tail pieces being contiguous with said jaw members and arranged in the path of said horns to cam open said upper jaws in the lowered position of the boom with the grab resting upon its lower jaws on the ground, and a combined hoisting and grab-closing cable connected to said upper tail piece.

4. A grab as claimed in claim 3 in which the cable runs over a sheave rotatably carried by the grab frame at a point removed from the grab pivot support by a distance greater than the length of the upturned horns carried on the boom whereby to rotate freely past said horn.

5. In a cane loader, a vehicle having a frame, a boom one end of which is universally mounted proximate one end of the frame of the vehicle at a low point, a vertical mast carried on the frame of the vehicle having a freely rotatable sheave vertically adjustable thereon, a bifurcated support on the free end of said boom, upturned horns at the ends of said bifurcated support, a grab pivotally carried on said bifurcated support comprising a grab frame pivoted about said bifurcated support, lower jaws integral with said grab frame and adapted to be slid along the ground in the loading operation upon the forward movement of the vehicle with the grab rotated clockwise to an upper position with respect to the grab pivot on the bifurcated support, upper jaws pivoted to the upper part of said grab frame at a point removed from the grab frame pivot support by a distance in excess of the length of said boom horns, upper and lower tail pieces on said upper jaws with the lower tail pieces arranged in the path of said horns to cam open the upper jaws when the boom is in the lowered position and the grab is resting upon the ground, a combined grab closing and hoisting cable one end of which is connected to the upper tail pieces of said upper jaws, means to wind in and pay out said cable, said winding and paying means having the other end of said cable attached thereto after passing over the sheave on said vertical mast and means for causing the lateral swinging of the boom coincident with its raising movement.

6. A cane loader as claimed in claim 5 wherein said means causing lateral swinging movement is a guide arm, one end of which is swivelly connected to the boom at the outer portion thereof, and the other end of which is swivelly mounted upon the vehicle frame at a point adjacent the universal mounting of the boom and spaced laterally therefrom.

7. A cane loader as claimed in claim 5 characterized by the fact that latching means is provided to retain the boom and grab in the raised position when the hoisting cable is slackened.

8. For use with a cane loader comprising a vehicle having a frame, a boom one end of which is universally mounted proximate one end of the frame of the vehicle at a low point, a vertical mast carried on the frame of said vehicle having a freely rotatable sheave vertically adjustable thereon, a bifurcated support on the free end of said boom, upturned horns at the ends of said bifurcated support; a grab pivotally carried on said bifurcated support comprising a grab frame and adapted to be slid along the ground during the loading operation upon the forward movement of the vehicle with the grab rotated clockwise to an upper position with respect to the grab pivot on the bifurcated support, upper jaws pivotally carried by said grab frame at a point removed from the grab frame pivot support; upper and lower tail pieces on said upper jaws with the lower tail pieces arranged in the path of said horns to cam open said upper jaws in the lowered position of the boom with the grab resting upon its lower jaws of the ground, and means for attaching a combined grab closing and hoisting cable one end of which is connected to said upper tail pieces of said upper jaws, and the other end of which is attached to a winding and paying device carried by said vehicle.

9. A cane grab as claimed in claim 8 characterized by the fact that the upper tail pieces are intermediate the upper jaw members and the lower tail pieces are contiguous with the jaw members at one end thereof.

10. In a cane loader, a vehicle having a frame, a boom one end of which is universally mounted proximate one end of the frame of said vehicle at a low point, a vertical mast carried on the frame of said vehicle having a freely rotatable sheave vertically adjustable thereon, a spring biased latch pivoted slightly beneath the height median of said vertical mast, a boom guide arm one end of which is swivelly attached proximate the free end of said boom and the other end of which is swivelly mounted on said vehicle frame adjacent said vertical mast and spaced therefrom, a plate carried by said boom guide arm engageable with said spring biased latch, a bifurcated support on the free end of said boom, upturned horns at the ends of said bifurcated support, a grab pivotally carried on said bifurcated support comprising a grab frame pivoted about said bifurcated support, lower jaws carried by said grab frame at the base thereof and adapted to be slid along the ground during the loading operation upon the forward movement of the vehicle with the grab rotated clockwise to an upper position with respect to the grab pivot on said bifurcated support, upper jaws pivoted to the upper part of said grab frame, upper and lower tail pieces on said upper jaws with the lower tail pieces arranged in the path of said horns to cam open the upper jaws when the boom is in the lowered position and the grab is resting upon the ground, a combined grab closing and hoisting cable one end of which is connected to the upper tail pieces of said jaws, and means to wind in and pay out said cable, said winding and paying means having the other end of said cable attached thereto after passing over the sheave on said vertical mast.

JOSEPH J. MUNSON.

REFERENCES CITED

The following references are of record in the file of this patent:

UNITED STATES PATENTS

| Number | Name | Date |
|---|---|---|
| 374,787 | Fleming | Dec. 13, 1887 |
| 675,157 | Howard | May 28, 1901 |
| 681,175 | Condra | Aug. 29, 1901 |
| 1,075,639 | Fleming | Oct. 14, 1913 |
| 1,170,905 | Hetlesaeter | Feb. 8, 1916 |
| 2,323,605 | Johnson | July 6, 1943 |
| 2,375,205 | Barras | May 8, 1945 |
| 2,387,656 | Gledhill | Oct. 23, 1945 |
| 2,404,619 | Coats | July 23, 1946 |
| 2,418,251 | Drott | Apr. 1, 1947 |